(12) United States Patent
Hasson et al.

(10) Patent No.: US 11,700,322 B2
(45) Date of Patent: *Jul. 11, 2023

(54) SERVICE PROCESS CONTROL METHOD AND NETWORK DEVICE

(71) Applicant: Huawei Technologies Co., Ltd., Shenzhen (CN)

(72) Inventors: Uri Hasson, Munich (DE); Shengjun Tang, Hangzhou (CN); Jun He, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/563,585

(22) Filed: Dec. 28, 2021

(65) Prior Publication Data
US 2022/0124184 A1 Apr. 21, 2022

Related U.S. Application Data

(63) Continuation of application No. 16/577,117, filed on Sep. 20, 2019, now Pat. No. 11,233,884, which is a (Continued)

(30) Foreign Application Priority Data

Jun. 3, 2013 (CN) .......................... 201310216184.0

(51) Int. Cl.
H04L 69/22 (2022.01)
H04L 49/20 (2022.01)
(Continued)

(52) U.S. Cl.
CPC .......... H04L 69/22 (2013.01); H04L 41/0893 (2013.01); H04L 43/028 (2013.01); (Continued)

(58) Field of Classification Search
CPC ... H04L 69/22; H04L 41/0893; H04L 43/028; H04L 45/74; H04L 47/20; H04L 49/20; H04L 69/324; H04L 61/2007; H04L 67/02
See application file for complete search history.

(56) References Cited

U.S. PATENT DOCUMENTS 6,970,428 B1 11/2005 Kobayashi
7,165,100 B2 1/2007 Cranor et al.
(Continued)

FOREIGN PATENT DOCUMENTS

CN 101022539 A 8/2007
CN 101119321 A 2/2008
(Continued)

OTHER PUBLICATIONS

"Software-defined networking: the service provider perspective," Ericsson Review, The communications technology journal since 1924, Feb. 21, 2013, 8 pages.

Primary Examiner — Ajay Cattungal
(74) Attorney, Agent, or Firm — Conley Rose, P.C.

(57) ABSTRACT

A service process control method includes selecting, according to an execution policy of at least one service deployed on a network device, M data processors for processing a packet received by the network device, determining a processing sequence for the selected M data processors to process the packet, and invoking the selected M data processors to sequentially process, according to the processing sequence, the packet. An execution sequence for a data processor to process the packet is dynamically generated according to a policy set corresponding to the service.

20 Claims, 5 Drawing Sheets

Related U.S. Application Data continuation of application No. 15/370,663, filed on Dec. 6, 2016, now Pat. No. 10,425,510, which is a continuation of application No. 14/557,701, filed on Dec. 2, 2014, now Pat. No. 9,537,982, which is a continuation of application No. PCT/CN2014/070910, filed on Jan. 20, 2014.

(51) Int. Cl.
*H04L 41/0893* (2022.01)
*H04L 43/028* (2022.01)
*H04L 45/74* (2022.01)
*H04L 47/20* (2022.01)
*H04L 69/324* (2022.01)
*H04L 61/5007* (2022.01)
*H04L 67/02* (2022.01)

(52) U.S. Cl.
CPC .............. *H04L 45/74* (2013.01); *H04L 47/20* (2013.01); *H04L 49/20* (2013.01); *H04L 69/324* (2013.01); *H04L 61/5007* (2022.05); *H04L 67/02* (2013.01)

(56) References Cited

U.S. PATENT DOCUMENTS

| | | | |
|---|---|---|---|
| 7,895,425 | B2 | 2/2011 | Khalid et al. |
| 7,990,974 | B1 * | 8/2011 | Gmuender ............ G06F 9/4881 709/212 |
| 8,989,192 | B2 | 3/2015 | Foo et al. |
| 10,097,452 | B2 | 10/2018 | Lefebvre et al. |
| 2001/0039576 | A1 * | 11/2001 | Kanada ............... H04L 41/0893 709/244 |
| 2002/0143955 | A1 | 10/2002 | Shimada et al. |
| 2005/0138189 | A1 * | 6/2005 | Tripathi .................... G06F 9/54 709/250 |
| 2005/0232262 | A1 * | 10/2005 | Toumura ............... H04L 45/583 370/389 |
| 2005/0289244 | A1 | 12/2005 | Sahu et al. |
| 2006/0034301 | A1 | 2/2006 | Anderson et al. |
| 2008/0002673 | A1 * | 1/2008 | Smitheimer ...... H04M 3/42229 370/352 |
| 2008/0177896 | A1 | 7/2008 | Quinn et al. |
| 2008/0201750 | A1 | 8/2008 | Jiang et al. |
| 2008/0267191 | A1 * | 10/2008 | Smitheimer ............ H04L 12/66 370/395.5 |
| 2010/0080226 | A1 | 4/2010 | Khalid et al. |
| 2010/0165985 | A1 | 7/2010 | Sharma et al. |
| 2010/0211535 | A1 * | 8/2010 | Rosenberger ........... G06F 16/48 706/20 |
| 2011/0271277 | A1 * | 11/2011 | Hussain ............... G06F 12/0653 718/1 |
| 2011/0310894 | A1 | 12/2011 | Karino |
| 2012/0047298 | A1 * | 2/2012 | Inoue .................. G06F 13/4256 710/107 |
| 2012/0281540 | A1 | 11/2012 | Khan et al. |
| 2013/0094507 | A1 | 4/2013 | Brebner |
| 2014/0123288 | A1 * | 5/2014 | Lee ..................... H04L 63/1416 726/23 |
| 2014/0156823 | A1 | 6/2014 | Liu et al. |
| 2014/0233385 | A1 | 8/2014 | Beliveau et al. |
| 2014/0266907 | A1 * | 9/2014 | Taylor, Jr. ................. G01S 5/10 342/387 |
| 2014/0334488 | A1 | 11/2014 | Guichard et al. |
| 2014/0355436 | A1 | 12/2014 | Zhang et al. |
| 2015/0085866 | A1 * | 3/2015 | Hasson ................... H04L 69/22 370/392 |

FOREIGN PATENT DOCUMENTS

| | | |
|---|---|---|
| CN | 101409885 A | 4/2009 |
| CN | 102665191 A | 9/2012 |
| CN | 103346974 A | 10/2013 |
| JP | 2002359637 A | 12/2002 |
| JP | 2004080272 A | 3/2004 |
| JP | 2005252367 A | 9/2005 |
| JP | 2005260571 A | 9/2005 |
| RU | 2353066 C2 | 4/2009 |
| WO | 2009007707 A1 | 1/2009 |
| WO | 2011074559 A1 | 6/2011 |
| WO | 2014085952 A1 | 6/2014 |

* cited by examiner

SERVICE PROCESS CONTROL METHOD AND NETWORK DEVICE

CROSS-REFERENCE TO RELATED APPLICATIONS

This is a continuation of U.S. patent application Ser. No. 16/577,117 filed on Sep. 20, 2019, which is a continuation of U.S. patent application Ser. No. 15/370,663 filed on Dec. 6, 2016, now U.S. Pat. No. 10,425,510, which is a continuation of U.S. patent application Ser. No. 14/557,701 filed on Dec. 2, 2014, now U.S. Pat. No. 9,537,982, which is a continuation of International Patent Application No. PCT/CN2014/070910 filed on Jan. 20, 2014, which claims priority to Chinese Patent Application No. 201310216184.0 filed on Jun. 3, 2013. All of the aforementioned patent applications are hereby incorporated by reference in their entireties.

TECHNICAL FIELD

The present disclosure relates to the field of communications, and in particular, to a service process control method and a network device.

BACKGROUND

Currently, a device on a network needs to perform all kinds of service control using a policy. For example, in a service execution procedure, a condition is first specified when a certain action needs to be executed, and the corresponding action is executed only when a packet or a data flow meets the set condition. A typical condition includes a condition such as a user dimension, a time dimension, a layer 3 (L3)-layer 4 (L4) (an Internet Protocol (IP) address+a Transmission Control Protocol (TCP) port number) dimension, an layer 7 (L7) protocol dimension, and a uniform resource locator (URL) dimension. A policy matching procedure is a procedure for comparing information of each dimension of a data flow with a set condition of the dimension.

Information of each dimension of a data flow is generally collected by different data processing modules. For example, user dimension information is identified by a user identifying module, time dimension information is identified by a time module, L3-L4 information is identified by an L3-L4 processing module, L7 protocol information is identified by an identifying module, and URL information is identified by a parsing module. More data processing modules need to be disposed on the device on the network to collect information of more dimensions if it is expected that there are richer device policies and more controllable dimensions.

Generally, each data processing module on the device on the network has a fixed function and is configured to determine collected information according to set logic. For example, a user management module is configured to determine all kinds of preset information of a user that needs to be collected, such as an IP, a mobile phone number, a role, and a class. Therefore, a procedure for collecting dimension information of a data flow becomes a procedure for executing each data processing module. For clear logic on the device, generally, information of the data flow needs to be first collected, then policy matching is performed, and finally an action corresponding to a policy is executed. A disadvantage of the foregoing procedure is that all modules configured to collect information are executed, thereby wasting device performance.

Therefore, a person skilled in the art improves the foregoing method. As shown in FIG. 1, all dimension information of a data flow is first collected. Then searching is performed in an information set to determine whether a set condition is met, and a corresponding action is executed if the set condition is met. That is, all modules configured to collect information are connected in series, and a fixed sequence is set. All flows undergo a same processing process and pass through each module according to the sequence. In this way, when all modules have been executed, information of each dimension is collected completely and can provide a basis for subsequent policy matching. In this method, design is simple, information is complete, and no function is omitted.

However, a disadvantage of the foregoing method is that an execution sequence for all data flows is the same, thereby ignoring a difference between the data flows. Information of different data flows is different. It is obvious that some data flows do not need to pass through a specific module. Therefore, collection of certain redundant information exists during sequential execution, thereby causing extra performance overhead.

SUMMARY

In view of this, embodiments of the present disclosure provide a service process control method and a network device in order to optimize a data flow processing process on a device in other approaches, reduce an unnecessary processing process and redundant information collection in a service execution procedure, and enhance overall performance of the device.

According to a first aspect, an embodiment of the present disclosure provides a service process control method, including selecting, according to an execution policy of at least one service deployed on a network device, M data processing modules for processing a packet received by the network device, and determining a processing sequence for the selected M data processing modules to process the packet, invoking the selected M data processing modules to sequentially process, according to the processing sequence, the packet such that each invoked data processing module collects information of one dimension of the packet, and performing, according to all information of the packet that is collected by the M data processing modules, matching for all service rules included in the execution policy of the at least one service in order to determine a successfully matched service rule, and executing an action corresponding to the successfully matched service rule.

In a first possible implementation manner of the first aspect, selecting M data processing modules for processing a packet received by the network device, and determining a processing sequence for the selected M data processing modules to process the packet includes extracting a condition from all service rules included in an execution policy of each service in the at least one service, and further determining all dimension information of the packet required to be used to determine whether the extracted condition is met, determining, according to all the determined dimension information, the M data processing modules required for collecting all the dimension information, and determining, according to a dependence relationship between the determined M data processing modules, the processing sequence for the M data processing modules to process the packet.

With reference to the first aspect or the first possible implementation manner of the first aspect, in a second possible implementation manner, the method further includes generating a first list that is used to represent the processing sequence for the M data processing modules to process the packet, where the first list includes identifications of the M data processing modules, and the identifications of the M data processing modules in the first list are sorted according to the determined processing sequence, and correspondingly, invoking the selected M data processing modules to sequentially process, according to the processing sequence, the packet includes sequentially invoking data processing modules corresponding to the first P data processing module identifications in the first list to process the packet in order to obtain information of P dimensions of the packet, where P is a positive integer, and sequentially invoking data processing modules corresponding to (M-P) data processing module identifications that are in the first list and after the first P data processing module identifications to process the packet in order to obtain information of at least one dimension of the packet.

With reference to the second possible implementation manner of the first aspect, in a third possible implementation manner, after sequentially invoking data processing modules corresponding to the first P data processing module identifications in the first list to process the packet in order to obtain information of P dimensions of the packet, the method further includes reselecting, according to the information of the P dimensions, one or more data processing modules for processing the packet, determining a processing sequence for the reselected data processing module to process the packet, and updating the first list in order to indicate the processing sequence for the reselected data processing module to process the packet, where an updated first list includes an identification of the reselected data processing module, and the identification of the reselected data processing module is sorted in the updated first list according to the sequence for the reselected data processing module to process the packet, and correspondingly, sequentially invoking data processing modules corresponding to (M-P) data processing module identifications that are in the first list and after the first P data processing module identifications to process the packet in order to obtain information of at least one dimension of the packet includes sequentially invoking, according to the sequence indicated by the updated first list, the reselected data processing module to process the packet in order to obtain the information of the at least one dimension of the packet.

With reference to the first aspect or the first, the second, or the third possible implementation manner of the first aspect, in a fourth possible implementation manner, the execution policy of each service further includes a preset configuration rule, where the configuration rule is used to represent an execution condition of the service. The method further includes obtaining characteristic information of the packet, determining, according to the characteristic information, whether an execution condition of each service deployed on the network device is met, and determining that a service whose execution condition is met is a service that needs to be executed, and correspondingly, selecting, according to an execution policy of at least one service deployed on a network device, M data processing modules for processing a packet received by the network device, and determining a processing sequence for the selected M data processing modules to process the packet includes selecting, according to the execution policy of the service that is determined and needs to be executed, the M data processing modules for processing the packet received by the network device, and determining the processing sequence for the selected M data processing modules to process the packet.

According to a second aspect, an embodiment of the present disclosure provides a network device, including a transceiver module, a list generating module, a scheduling module, and N data processing modules, where N is a positive integer and each data processing module is configured to collect information of one dimension of a packet. The transceiver module is configured to receive a packet. The list generating module is configured to select, according to an execution policy of at least one service deployed on the network device, M data processing modules for processing the packet received by the transceiver module, and determine a processing sequence for the selected M data processing modules to process the packet, where M is a positive integer, M is less than or equal to N, an execution policy of each service includes at least one service rule, each service rule includes a condition and an action, and matching of each service rule at least depends on information of one dimension of the packet, and the scheduling module is configured to invoke the M data processing modules selected by the list generating module to sequentially process, according to the processing sequence, the packet in order to obtain information of at least one dimension of the packet, perform, according to the information of the at least one dimension of the packet, matching for all service rules included in the execution policy of the at least one service in order to determine a successfully matched service rule, and execute an action corresponding to the successfully matched service rule.

In a first possible implementation manner of the second aspect, the list generating module includes an extracting unit configured to extract a condition from all service rules included in the execution policy of the at least one service, and determine all dimension information of the packet required to be used to determine whether the extracted condition is met, a selecting unit configured to select, according to all the dimension information determined by the extracting unit, the M data processing modules required for collecting all the dimension information, and a sorting unit configured to determine, according to a dependence relationship between the M data processing modules selected by the selecting unit, the processing sequence for the M data processing modules to process the packet.

With reference to the second aspect or the first possible implementation manner of the second aspect, in a second possible implementation manner, the list generating module further includes a list generating unit configured to generate a first list that is used to represent the processing sequence for the M data processing modules that are determined by the sorting unit and process the packet, where the first list includes identifications of the M data processing modules, and the identifications of the M data processing modules in the first list are sorted according to the processing sequence, and the scheduling module includes a first scheduling unit configured to sequentially invoke data processing modules corresponding to the first P data processing module identifications in the first list to process the packet in order to obtain the information of the at least one dimension of the packet, where P is a positive integer, and a second scheduling unit configured to sequentially invoke data processing modules corresponding to (M-P) data processing module identifications that are in the first list and after the first P data processing module identifications to process the packet in order to obtain the information of the at least one dimension of the packet.

With reference to the second possible implementation manner of the second aspect, in a third possible implementation manner, the list generating module is further configured to reselect, according to the information of the at least dimension of the packet, one or more data processing modules for processing the packet, determine a processing sequence for the reselected data processing module to process the packet, and update the first list in order to indicate the processing sequence for the reselected data processing module to process the packet after the first scheduling unit invokes the data processing modules corresponding to the first P data processing module identifications in the first list to process the packet in order to obtain the information of the at least one dimension of the packet, where an updated first list includes an identification of the reselected data processing module, and the identification of the reselected data processing module is sorted in the updated first list according to the sequence for the reselected data processing module to process the packet, and correspondingly, the second scheduling unit is configured to sequentially invoke, according to the sequence indicated by the updated first list, the reselected data processing module to process the packet in order to obtain the information of the at least one dimension of the packet.

With reference to the second aspect or the first, the second, or the third possible implementation manner of the second aspect, in a fourth possible implementation manner, the execution policy of each service further includes a preset configuration rule, where the configuration rule is used to represent an execution condition of the service. The network device further includes an identifying module configured to obtain characteristic information of the packet, determine, according to the characteristic information, whether an execution condition of each service deployed on the network device is met, and determine that a service whose execution condition is met is a service that needs to be executed, and the list generating module is configured to select, according to the execution policy of the service that is identified by the identifying module and needs to be executed, the M data processing modules for processing the packet received by the transceiver module, and determine the processing sequence for the selected M data processing modules to process the packet.

It can be known from the foregoing technical solutions that, in the foregoing technical solutions of the embodiments of the present disclosure, after receiving a packet, a network device dynamically generates, according to an execution policy corresponding to a service, an execution sequence for a data processing module to process the packet, and further sequentially invokes, according to the sequence, each data processing module to process the packet such that the packet does not need to undergo processing of each data processing module and an unnecessary processing process and redundant information collection can be reduced in a service execution procedure, thereby improving service processing flexibility and enhancing overall performance of the device.

BRIEF DESCRIPTION OF DRAWINGS

To describe the technical solutions in the embodiments of the present disclosure more clearly, the following briefly introduces the accompanying drawings required for describing the embodiments of the present disclosure.

DESCRIPTION OF EMBODIMENTS

To make the objectives, technical solutions, and advantages of the present disclosure clearer, the following clearly describes the technical solutions of the present disclosure with reference to the accompanying drawings in the embodiments of the present disclosure. The described embodiments are a part of the embodiments of the present disclosure. Based on the following embodiments of the present disclosure, persons of ordinary skill in the art may still obtain other embodiments that can solve technical problems of the present disclosure and implement technical effects of the present disclosure by making equivalent changes to a part or even all of technical features.

Figure 1:
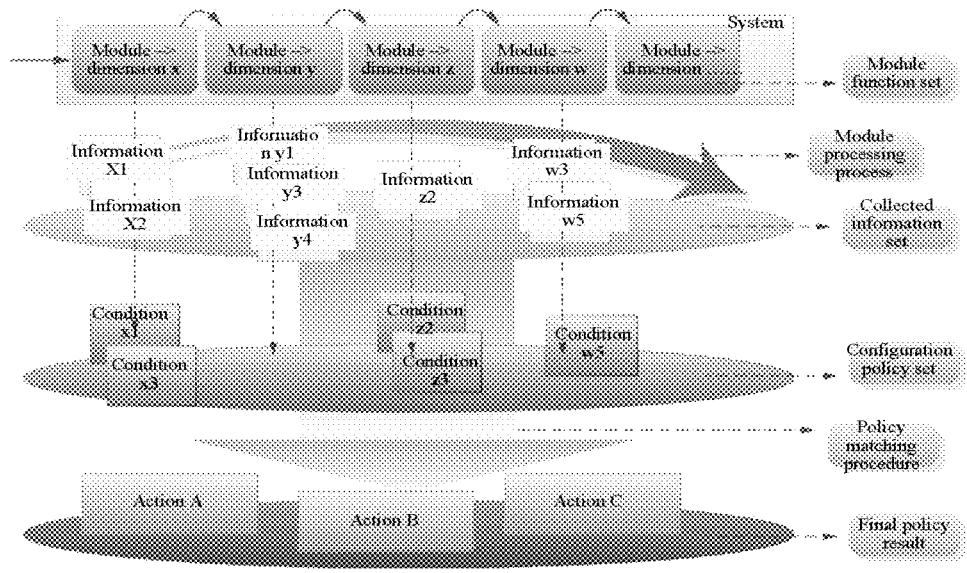
FIG. 1 is a schematic flowchart of policy-based service processing according to an embodiment of the present disclosure.
Figure 2:
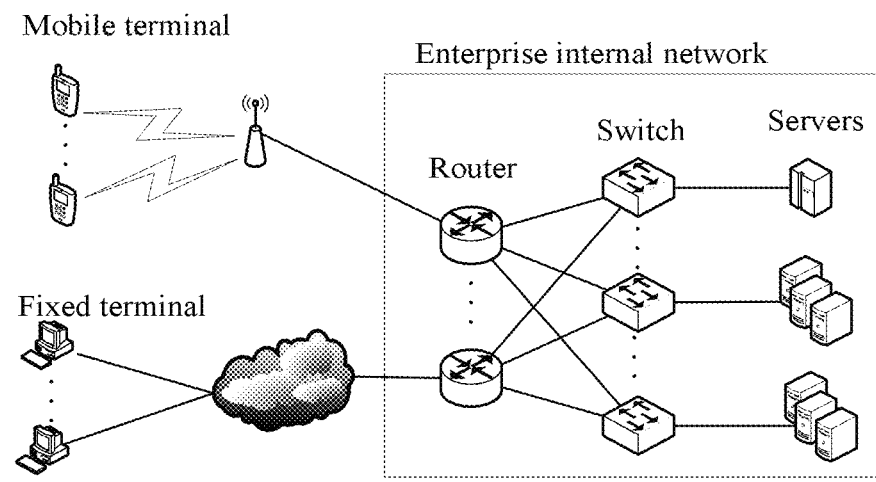
FIG. 2 is a schematic network diagram of an enterprise private cloud according to an embodiment of the present disclosure.

In the embodiments of the present disclosure, a processing module that needs to be invoked during execution of a service process is determined according to a currently configured policy set. An executing module configured to process information of the dimension may be directly skipped and does not appear in a subsequent execution process if all policies in the policy set do not relate to a dimension condition of a certain dimension. The technical solutions provided in the embodiments of the present disclosure may be applied to multi-application service policy control scenarios, such as a home network, an access network, a convergence network, a backbone network, an enterprise network, an operator network, and various private/public clouds. The following gives a brief description using an enterprise network as a typical application scenario. FIG. 2 shows a common scenario in which an enterprise provides an external service. A user accesses a network using a mobile terminal or a fixed terminal and requests a service. An enterprise internal network is usually formed of a network device, such as a router, a switch, and a server. According to a requirement, a service, such as Intrusion Prevention System (IPS), bandwidth control, URL filtering, Wide-area-network Optimization Controller (WOC), and Application Delivery Controller (ADC), is generally deployed on one or more network devices. A plurality of services is usually deployed on a same device. In this case, multiple kinds of services on the network device need to be controlled reasonably to improve service processing efficiency. The user configures multiple kinds of policies in a manner such as a configuration user interface (UI) or a specified policy script, and delivers the multiple kinds of policies to the network device. The network device implements processing on the multiple kinds of services on the device based on the policies. In the technical solutions provided in the embodiments of the present disclosure, a service process can be dynamically controlled according to a policy of a service deployed on the network device. It should be noted that the enterprise network scenario is merely a typical application scenario of the technical solutions of the present disclosure, but is not construed as a limitation on application scenarios of the present disclosure.

Figure 3:
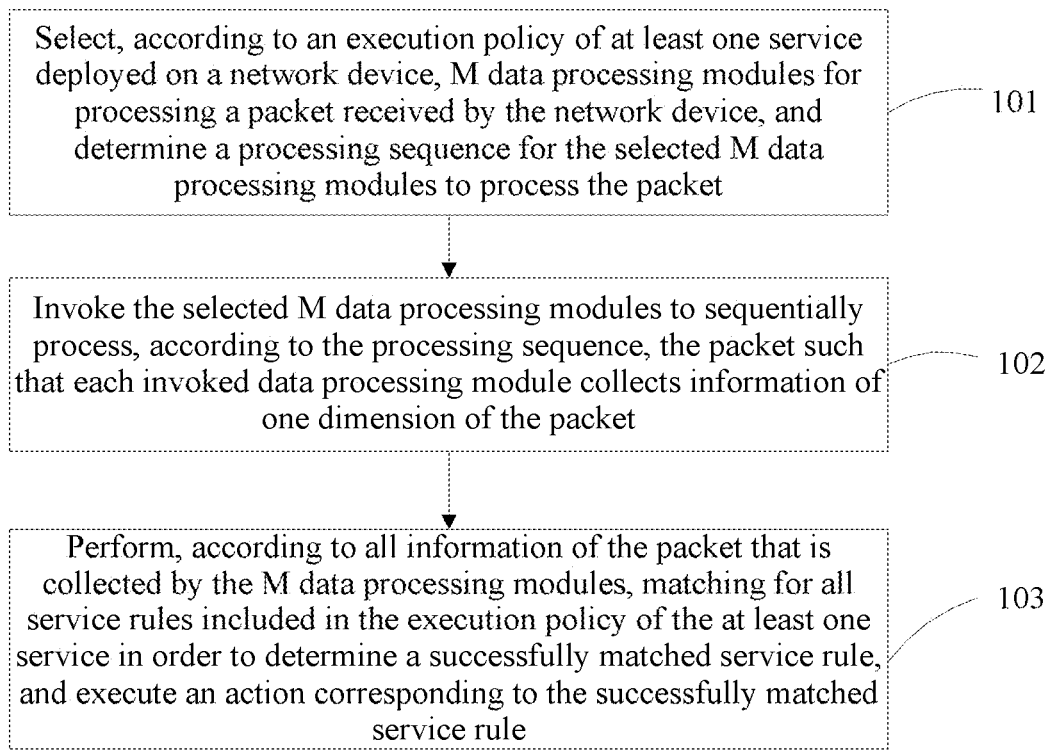
FIG. 3 is a flowchart of a service process control method according to an embodiment of the present disclosure.

FIG. 3 is a schematic flowchart of a service process control method according to an embodiment of the present disclosure. As shown in FIG. 3, in this embodiment, the service process control method described using a network device as an example includes the following steps.

Step 101: Select, according to an execution policy of at least one service deployed on a network device, M data processing modules for processing a packet received by the network device, and determine a processing sequence for the selected M data processing modules to process the packet.

Step 102: Invoke the selected M data processing modules to sequentially process, according to the processing sequence, the packet such that each invoked data processing module collects information of one dimension of the packet.

Step 103: Perform, according to all information of the packet that is collected by the M data processing modules, matching for all service rules included in the execution policy of the at least one service in order to determine a successfully matched service rule, and execute an action corresponding to the successfully matched service rule.

It should be noted that, in this embodiment of the present disclosure, the network device is used as an executing body to describe the technical solutions of the present disclosure, but shall not be understood as a limitation on the executing body of the embodiment of the present disclosure. It may be understood that any device with multi-dimension policy control may adopt the technical solutions of the present disclosure.

The network device includes N data processing modules (where N is greater than or equal to M, and M and N are both positive integers), and each data processing module is configured to collect information of one dimension of a packet. For example, user dimension information is collected by a user identifying module, time dimension information is collected by a time module, L3-L4 information is collected by an L3-L4 processing module, L7 protocol information is identified by an identifying module, and URL information is identified by a parsing module. In this embodiment of the present disclosure, the execution policy is mainly used to control operation of a service. Each service deployed on the network device is configured with a corresponding execution policy. A collection of execution policies of a plurality of services forms a policy set. The execution policy of each service includes at least one service rule, where the service rule is a rule abided by when the service is executed. One service rule includes two parts, a condition and an action. Further, one service rule may include one or more conditions, and may also include one or more actions, and a plurality of conditions in a same service rule may be related to packet information at different layers or in different dimensions. Therefore, matching of each service rule at least depends on information of one dimension of a packet. Alternatively, more precisely, if it is required to determine whether each service rule is matched, it is required to determine whether a condition included in a service rule is met. Determining whether the condition in the service rule is met at least depends on information of one dimension of a packet. For example, in a service rule if (IP=1.1.1.1 && HTTP. Host=www.huawei.com) then drop packet, "IP=1.1.1.1" and "HTTP. Host=www.huawei.com" are two parallel conditions, where the former is an L3 layer condition, the latter is an L7 layer condition, the former and the latter are logically in an "and" relationship, and "drop packet" is an action that a service needs to execute when the conditions are met (that is, the service rule is successfully matched).

In an embodiment, in the following manner, M data processing modules for processing a first packet received by the network device may be selected and a processing sequence for the selected M data processing modules to process the first packet may be determined.

Step 1: Extract a condition from all service rules included in an execution policy of each service in the at least one service, and further determine all dimension information of the first packet required to be used to determine whether the extracted condition is met.

Step 2: Determine, according to all the determined dimension information, the M data processing modules required for collecting all the dimension information.

Step 3: Determine, according to a dependence relationship between the M data processing modules, the processing sequence for the M data processing modules to process the first packet.

Because the policy of each service includes one or more service rules, by extracting and collecting all conditions included in each service rule, it can be determined that in order to complete verification on all conditions, information of which dimension of the first packet needs to be collected, and then it is determined which data processing module is required for collecting information of the dimension of the first packet. A data processing module configured to collect the information of the dimension is not required either if information of a certain dimension is not required. Further, a scope of information that needs to be collected by a module configured to collect the information of the dimension can be determined if information of a certain dimension is required. For example, a user management module may be configured to collect user information such as an IP address, a mobile phone number, a role, and a class. However, if determination of a certain service rule relates only to an IP address of a user, it can be determined that a scope of information that needs to be collected by the user management module is only limited to the IP address of the user, and other information does not need to be collected. After which data processing module is required to process the first packet is determined, a dependence relationship between modules (that is, a dependence relationship between information of different dimensions of the packet) is analyzed such that an execution sequence of the data processing module (that is, the processing sequence for processing the first packet) can be determined. For example, assuming that another data processing module B must be executed first if a data processing module A needs to be executed, the module B must be executed before the module A. For another example, assuming that a module D must be executed first if a module C needs to be executed, the dependent module D must also be included as long as the module C needs to be used, regardless of whether a policy includes dimension information collected by the module D.

For example, the data processing module may be a related module such as a user module configured to identify user information corresponding to a packet, a URL obtaining module configured to obtain URL information of a packet, an L3-L4 layer processing module configured to parse L3-L4 layer information of a packet, an L7 layer identifying module configured to identify an L7 layer protocol, or an L7 layer parsing module configured to parse L7 layer information. In this embodiment of the present disclosure, the data processing module is not limited, and the data processing module can be configured according to an actual need.

Figure 4:
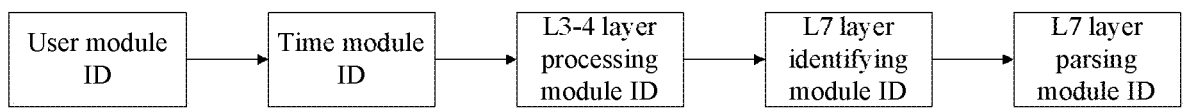
FIG. 4 is a schematic diagram of a first list according to an embodiment of the present disclosure.

Preferably, in an embodiment, a first list (such as the list of FIG. 4) used to represent an execution sequence of the determined M data processing modules may be generated, and further, the data processing module may be invoked according to an indication of the first list to process the packet. Further, the first list includes identifications of the determined M data processing modules, and the identifications of the M data processing modules are sorted in the first list according to the determined processing sequence. It should be noted that an identification of a data processing module herein is a code of the data processing module. A unique identification can be allocated to each data processing module to represent the data processing module. In a specific application, the first list may be a data sheet, a file, or a picture. As shown in FIG. 4, the first list may be a single-entry linked list, where each node in the single-entry linked list stores an identification (ID) of one data processing module, and a link relationship between nodes represents an execution sequence of data processing modules.

After the M data processing modules have been executed, matching is performed between all information of the packet that is collected by the M data processing modules and each service rule included in the execution policy of the at least one service in order to determine a successfully matched service rule, and further, an action corresponding to the successfully matched service rule is executed. A service rule matching procedure is a procedure for verifying a condition included in a service rule. Matching of the rule is successful if a condition in a service rule is met, and an action corresponding to the rule can be executed. The foregoing has described the rule matching procedure in detail using an example, and details are not repeatedly described herein.

For example, if the number of data processing modules in the first list is one, the network device may invoke one data processing module to process the packet received by the network device. If the data processing module completes processing, a service process ends. Therefore, another excessive operation process can be avoided.

If the number of data processing modules in the first list is two, for example, a module 1 and a module 2, and in the first list, the module 1 has a higher rank than the module 2, the network device invokes, according to sorting in the first list, the module 1 to process the packet. After the module 1 processes the packet, the network device invokes the module 2 to process a packet that has been processed by the module 1, and after the module 2 completes processing, the service process ends such that the packet does not undergo all data processing modules on the device, thereby optimizing a data flow processing process on a device in other approaches, improving service processing flexibility, and enhancing overall performance of the device.

Optionally, when the network device invokes a data processing module corresponding to the $N^{th}$ data processing module identification in the first list, the module may set a mark on the packet when processing the packet. After the module completes processing and returns a processed packet, the network device may learn that the $N^{th}$ data processing module has been executed and invoke a data processing module corresponding to the $(N+1)^{th}$ data processing module identification in the first list to perform further processing on the packet that has been processed by the data processing module. In a specific application, a data processing module in the first list may be invoked using a callback function such that the data processing module processes a corresponding packet. Control flexibility is improved using the callback function.

Further, after one data processing module completes processing on the packet, information of one dimension of the packet is collected. The first list is updated according to the information. For example, after data processing modules corresponding to the first P data processing module identifications in the first list are sequentially invoked to process the packet received by the network device, information of P dimensions of the packet is obtained, where P is a positive integer. Further, one or more data processing modules for processing the packet may be reselected according to the information of the P dimensions, and a processing sequence for the reselected data processing module to process the packet is determined, and further, the first list is updated in order to indicate the processing sequence for the reselected data processing module to process the packet, where an updated first list includes an identification of the reselected data processing module, and the identification of the reselected data processing module is sorted in the updated first list according to the sequence for the reselected data processing module to process the packet. In this way, the execution sequence of the data processing module can be dynamically adjusted in the service execution procedure. In an embodiment, after the first P data processing modules in the first list collect the information of the P dimensions of the packet, matching may be performed between the information of the P dimensions and all service rules included in the execution policy of each service deployed on the network device, one or more data processing modules for performing subsequent processing for the packet is reselected according to a matching result, and a second list used to indicate a sequence for the reselected data processing module to process the packet is generated. For example, it is assumed that a module A is configured to collect information of an X dimension, and a corresponding condition type is X1, X2, X3, . . . , a module B is configured to collect information of a Y dimension, and a corresponding condition type is Y1, Y2, Y3, . . . , a module C is configured to collect information of a Z dimension, and a corresponding condition type is Z1, Z2, Z3, . . . , and a module D is configured to collect information of a W dimension, and a corresponding condition type is W1, W2, W3, . . . . It is assumed that currently, there is a policy "if((X1 & Y2)|Z3)& W4)then," where it may be understood that the policy is formed of two service rules "if(X1 & Y2 & W4)then" or "if(Z3 & W4)then". After the module A completes processing, it is found that the condition X1 is not met. Therefore, a preceding service rule is definitely not matched, and it only needs to consider whether a next service rule is matched. In this case, it may be learned that the dimension Z and the dimension W need to be determined, and therefore a list of modules that the packet undergoes is C→D. The module B responsible for the Y dimension can be eliminated from the module list.

It can be seen that if the first list is not dynamically updated according to a result for processing, by the processing module, the packet, after the data processing modules corresponding to the first P data processing module identifications in the first list complete processing on the packet, the network device continues to invoke data processing modules corresponding to (M-P) data processing module identifications that are after the first P data processing module identifications to sequentially process the packet that has been processed by the first P data processing modules in order to obtain information of (M-P) dimensions of the packet. However, after a mechanism for dynamically adjusting a module list is introduced, after the first P data processing modules complete processing on the packet, the reselected data processing module is sequentially invoked according to the sequence indicated by the updated first list in order to process the packet and further obtain information of one or more dimensions of the packet.

It should be noted that the foregoing steps for dynamically adjusting a module execution list may be constantly repeated in a service execution procedure until service processing is completed. If complexity is not considered, after each data module completes processing on the packet, a list of a module for performing subsequent processing on the packet can be dynamically adjusted according to a result for processing, by the module, the packet.

In an optional application scenario, the execution policy of the service further includes a configuration rule that is preset by a user, where the configuration rule is used to represent an execution condition of the service. For example, the configuration rule may be as follows Access from a user A corresponding to an IP address 1 is allowed, and access from a user B corresponding to an IP address 2 is not allowed.

Optionally, before step 101, the service process control method in this embodiment may further include the following step 100.

Step 100: Obtain characteristic information of the packet, determine, according to the characteristic information, whether an execution condition of each service deployed on the network device is met, and determine that a service whose execution condition is met is a service that needs to be executed.

It should be noted that the characteristic information of the packet may be some basic information that is included in a packet header and is used to represent a packet characteristic, for example, information such as a URL, a quintuple, and a transport layer protocol type. For example, the characteristic information of the packet may include a timestamp of the packet, sending software of the packet, a protocol of the packet, a URL address carried in the packet, IP address information of a packet receiving end, and/or port information of the packet receiving end, and the like. Further, a plurality of services are deployed on the network device. Generally, in a procedure for processing one packet, not all services are executed. After receiving one packet, the network device performs matching between the configuration rule and characteristic information of the packet, such as a timestamp of the packet, a URL carried in the packet, a protocol type of the packet, an IP address of a packet receiving end, and/or port information of the packet receiving end, determines whether a condition included in the configuration rule is met, and further determines which service needs to be executed currently. Correspondingly, after a service that needs to be executed is determined, M data processing modules for processing the packet is selected according to a policy set corresponding to the service that is determined and needs to be executed, and a processing sequence for the selected M data processing modules to process the packet is determined.

Optionally, the execution policy of the service may further have a priority. For example, a condition of an X dimension that is corresponding to a data processing module A is IP=10.10.*, a condition of a Y dimension that is corresponding to a data processing module B is Port=80, a condition of a Z dimension that is corresponding to a data processing module C is L7 layer protocol=HTTP, and a condition of a W dimension that is corresponding to a data processing module D is URL=www.huawei.com.

The configuration rule may include Rule 1: Block access, and Rule 2: Allow access.

A first execution policy may include "IP=10.10.," and "Port=80"&"Rule 1."

A second execution policy may include "L7 layer protocol=HTTP," and "URL=www.huawei.com" & "Rule 2."

In this case, a priority of the first policy is low, and a priority of the second policy is high.

In another embodiment, to help the network device determine, according to the execution policy of the service, which data processing module needs to be executed and an execution sequence, a user first presets a default execution sequence between data processing modules, that is, a sequence in which each of the data processing modules should be executed when conditions of two or more than two dimensions need to be verified. For example, when the policy is "if(X1 & Y2 & Z3 & . . . ) then," it indicates that a condition of each dimension needs to be verified, that is, each data processing module needs to be executed, and when the data processing modules are not associated with each other, in this case, the execution sequence of the data processing modules that is set is the default execution sequence.

Further, after the default execution sequence is obtained, a module list of all data processing modules sorted according to the default execution sequence can be obtained. Further, a dimension condition of each type is obtained by analyzing according to a policy set. A data processing module corresponding to the dimension condition of the type can be deleted from the module list, and a new list is obtained, that is, the first list if a dimension condition of a certain type does not need to be verified.

Therefore, according to the service process control method in this embodiment, after a packet is received, according to an execution policy of a service, a data processing module that needs to process the packet and an execution sequence for each data processing module to perform processing are determined such that the packet does not need to undergo processing of each data processing module, an unnecessary processing process and redundant information collection can further be reduced in a service execution procedure, and a function scope of the data processing module is controlled according to a need, thereby improving service processing flexibility and enhancing overall performance of a device.

In addition, the packet in this embodiment of the present disclosure may be a packet received by a communications device, or a packet that a communications device prepares to send, or a network packet, and this embodiment sets no limitation on a source of the packet.

Figure 5:
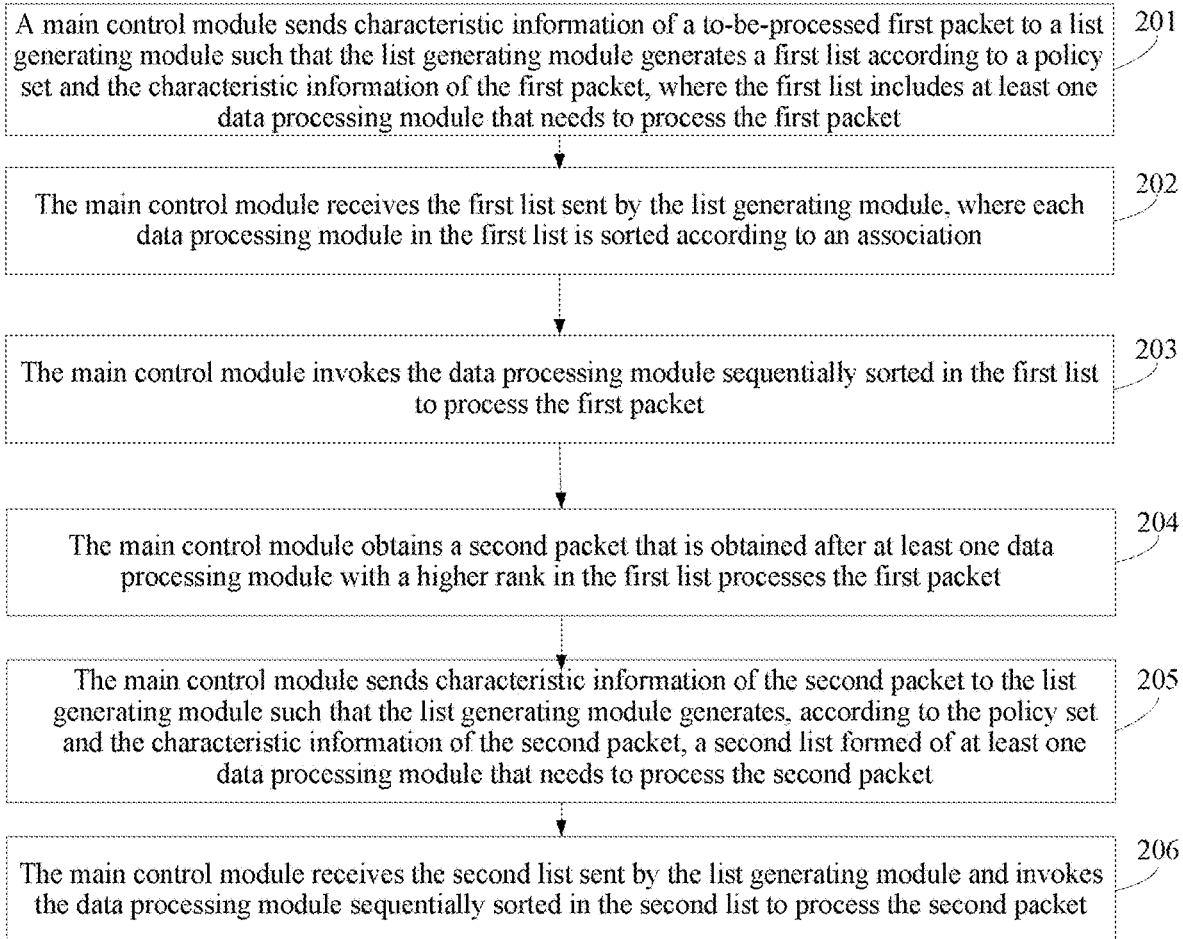
FIG. 5 is a schematic flowchart of a service process control method according to another embodiment of the present disclosure.

FIG. 5 is a schematic flowchart of a service process control method according to another embodiment of the present disclosure. The service process control method in this embodiment is described as follows.

Step 201: A main control module sends, to a list generating module, characteristic information of a first packet to be processed such that the list generating module generates a first list according to a policy set and the characteristic information of the first packet, where the first list includes at least one data processing module that needs to process the first packet.

Step 202: The main control module receives the first list sent by the list generating module, where each data processing module in the first list is sorted according to an association.

Step 203: The main control module invokes the data processing module sequentially sorted in the first list to process the first packet.

According to the service process control method in this embodiment, a data flow processing process on a device in other approaches can be optimized, service processing flexibility is enhanced, and overall performance of the device is improved.

Optionally, on the basis of the embodiment shown in FIG. 5, the service process control method in this embodiment further includes the following step 204, step 205, and step 206, as shown in FIG. 5.

Step 204: The main control module obtains a second packet that is obtained after at least one data processing module with a higher rank in the first list processes the first packet.

Step 205: The main control module sends characteristic information of the second packet to the list generating module such that the list generating module generates, according to the policy set and the characteristic information of the second packet, a second list formed of at least one data processing module that needs to process the second packet.

Step 206: The main control module receives the second list sent by the list generating module and invokes the data processing module sequentially sorted in the second list to process the second packet.

The characteristic information of the second packet may include the characteristic information of the first packet. For example, in a scenario, the characteristic information of the second packet may be the sum of the characteristic information of the first packet and characteristic information of an added packet.

Therefore, the first list is generated based on the current policy set and the characteristic information of the first packet, and the first list is dynamically adjusted in a processing procedure, for example, to obtain the second list in order to achieve an objective of dynamically controlling a service execution process.

For example, a parsing module is not executed when any one combination in the policy set is not configured with a condition related to a URL dimension. Particularly, it is obtained in an execution procedure, by analyzing according to a part of known dimension information and from a policy in the policy set once again, that some data processing modules do not need to be executed in order to achieve an objective of adjusting the first list and changing an execution process.

In this embodiment, not only an impact of characteristic information of different packets on a processing process is considered, but also an impact of a currently configured policy on the processing process is also considered, thereby avoiding an excessive operation step, improving overall performance, and enhancing service processing flexibility.

Figure 6:
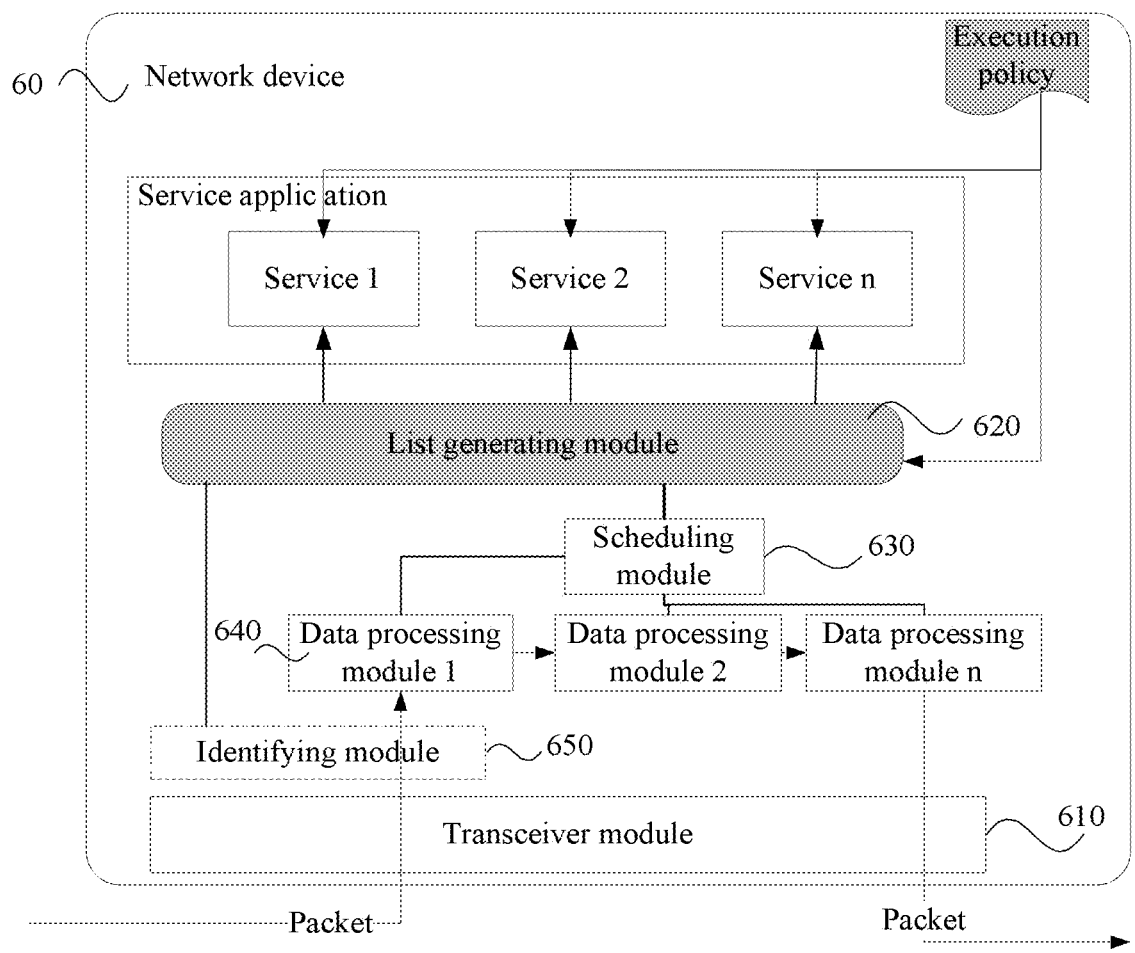
FIG. 6 is a schematic diagram of a network device according to an embodiment of the present disclosure.

Corresponding to the foregoing method embodiments, as shown in FIG. 6, an embodiment of the present disclosure further provides a network device 60. The network device 60 may be a device, such as a router, a switch, a gateway, or a server. According to FIG. 6, one or more service applications (such as a service 1, a service 2, and a service n in FIG. 6) are deployed on a network device 60. The network device 60 includes a transceiver module 610, a list generating module 620, a scheduling module 630, and N data processing modules (in this embodiment of the present disclosure, 640 in FIG. 6 is used as example for description), where N is a positive integer, and each data processing module 640 is configured to collect information of one dimension of a packet.

The transceiver module 610 is configured to receive a packet.

The list generating module 620 is configured to select, according to an execution policy of at least one service deployed on the network device 60, M data processing modules 640 for processing the packet received by the transceiver module 610, and determine a processing sequence for the selected M data processing modules 640 to process the packet, where M is a positive integer, M is less than or equal to N, an execution policy of each service includes at least one service rule, each service rule includes a condition and an action, and matching of each service rule at least depends on information of one dimension of the packet.

It should be noted that, in this embodiment of the present disclosure, an execution policy is mainly used to control an operation state of a service. Each service deployed on the network device is configured with a corresponding execution policy. A collection of execution policies of a plurality of services forms a policy set. The execution policy of each service includes at least one service rule, where the service rule is a type of execution policy of the service. One service rule includes two parts, a condition and an action. Further, one service rule may include one or more conditions, and may also include one or more actions, and a plurality of conditions in a same service rule may be related to packet information at different layers or in different dimensions. That is, if it is required to determine whether a condition included in each service rule is met, at least information of one dimension of a packet is depended on, that is, matching of each service rule at least depends on information of one dimension of the packet.

The scheduling module 630 is configured to invoke the M data processing modules 640 selected by the list generating module 620 to sequentially process, according to the processing sequence, the packet in order to obtain information of at least one dimension of the packet, perform, according to the information of the at least one dimension of the packet, matching for all service rules included in the execution policy of the at least one service in order to determine a successfully matched service rule, and execute an action corresponding to the successfully matched service rule.

Figure 7:
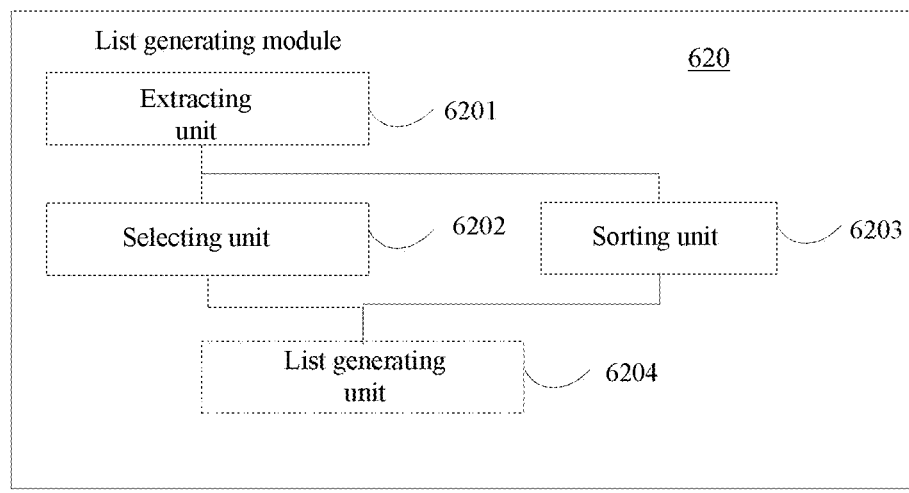
FIG. 7 is a schematic diagram of a list generating module according to an embodiment of the present disclosure.

In an embodiment, as shown in FIG. 7, the list generating module 620 includes an extracting unit 6201 configured to extract a condition from all service rules included in the execution policy of the at least one service deployed on the network device 60, and determine all dimension information of the packet required to be used to determine whether the extracted condition is met, a selecting unit 6202 configured to select, according to all the dimension information determined by the extracting unit 6201, the M data processing modules 640 required for collecting all the dimension information, and a sorting unit 6203 configured to determine, according to a dependence relationship between the M data processing modules selected by the selecting unit 6202, the processing sequence for the M data processing modules 640 to process the packet.

Preferably, in another embodiment, the list generating module 620 may further include a list generating unit 6204 configured to generate a first list that is used to represent the processing sequence for the M data processing modules 640 determined by the sorting unit 6203 to process the packet, and send the first list to the scheduling module 630, where the first list includes identifications of the M data processing modules 640, and the identifications of the M data processing modules 640 in the first list is sorted according to the processing sequence determined by the sorting unit 6203. In this way, after receiving the first list, the scheduling module 630 may invoke, according to the sequence indicated by the first list, a corresponding data processing module 640 to process the packet received by the network device 60. It should be noted that an identification of a data processing module herein is a code of the data processing module. A unique identification may be allocated to each data processing module to represent the data processing module. In a specific application, the first list may be a data sheet, a file, or a picture. As shown in FIG. 4, the first list may be a single-entry linked list, where each node in the single-entry linked list stores an ID of one data processing module 640, and a link relationship between nodes represents an execution sequence of data processing modules 640. When the scheduling module 630 invokes a data processing module 640 corresponding to the $i^{th}$ data processing module identification in the first list, the data processing module 640 may set a mark on the packet when processing the packet. When the data processing module 640 completes processing and returns a processed packet, the network device 60 can learn that the $i^{th}$ data processing module 640 has been executed, and may invoke a data processing module 640 corresponding to the $(i+1)^{th}$ data processing module identification in the first list to perform further processing on the packet that has been processed by the data processing module 640 corresponding to the $i^{th}$ data processing module identification. In a specific application, a data processing module 640 in the first list may be invoked using a callback function such that the data processing module 640 processes a corresponding packet, and control flexibility is improved using the callback function.

In another embodiment, the scheduling module 630 may include a first scheduling unit (not shown) configured to sequentially invoke a data processing module 640 corresponding to the first P data processing module identifications in the first list to process the packet in order to obtain the information of the at least one dimension of the packet, where P is a positive integer, and a second scheduling unit (not shown) configured to sequentially invoke a data processing module 640 corresponding to (M-P) data processing module identifications that are in the first list and are after the first P data processing module identifications to sequentially process the packet that has been processed by the first P data processing modules 640 in order to obtain the information of the at least one dimension of the packet.

Further, after one data processing module 640 completes processing on the packet, information of a part of dimensions corresponding to the packet is correspondingly obtained, and the list generating module 620 may update the first list according to the obtained information of a part of dimensions of the packet.

Further, after the first scheduling unit invokes the data processing modules 640 corresponding to the first P data processing module identifications in the first list to process the packet in order to obtain information of P dimensions of the packet, the list generating module 620 may reselect, according to the information of the P dimensions, one or more data processing modules for processing the packet, determine a processing sequence for the reselected data processing module to process the packet, and update the first list in order to indicate the processing sequence for the reselected data processing module to process the packet, where an updated first list includes an identification of the reselected data processing module 640, and the identification of the reselected data processing module 640 is sorted in the updated first list according to the sequence for the reselected data processing module 640 to process the packet.

In this case, the second scheduling unit may sequentially invoke, according to the sequence indicated by the updated first list, the reselected data processing module 640 to process the packet in order to obtain the information of the at least one dimension of the packet. In this way, the execution sequence of the data processing module 640 can be dynamically adjusted in an execution procedure, the data processing module 640 in the list can be updated in real time, and an objective of dynamic adjustment can be achieved. Further, a data flow processing process on a device in other approaches can be optimized, service processing flexibility is improved, and overall performance of the device is enhanced.

It should be noted that the foregoing steps for dynamically adjusting a module execution list may be constantly repeated in a service execution procedure until service processing is completed. If complexity is not considered, after each data processing module 640 completes processing on the packet, a list of a module for performing subsequent processing on the packet can be dynamically adjusted according to a result for processing, by the data processing module 640, the packet.

In an optional application scenario, the execution policy of the service further includes a configuration rule that is preset by a user, where the configuration rule is used to represent an execution condition of the service. For example, the configuration rule may be as follows. A user A corresponding to an IP address 1 is allowed to execute a service 1, and a user B corresponding to an IP address 2 is not allowed to execute the service 1.

Optionally, the network device 60 further includes an identifying module 650 configured to obtain characteristic information of the packet, determine, according to the characteristic information, whether an execution condition of each service deployed on the network device is met, and determine that a service whose execution condition is met is a service that needs to be executed.

It should be noted that the characteristic information of the packet may be some basic information that is included in a packet header and is used to represent a packet characteristic, for example, information such as a URL, a quintuple, and a transport layer protocol type. For example, the characteristic information of the packet may include a timestamp of the packet, sending software of the packet, a protocol of the packet, a URL address of packet access, IP address information of a packet receiving end, and/or port information of the packet receiving end, and the like. Further, a plurality of services are deployed on the network device 60. Generally, in a procedure for processing one packet, not all services are executed. After the transceiver module 610 receives one packet, the identifying module 650 performs matching between characteristic information of the packet, such as a timestamp of the packet, a URL carried in the packet, a protocol type of the packet, an IP address of a packet receiving end, and/or port information of the packet receiving end, and a configuration rule of each service, determines whether a condition included in the configuration rule of each service is met, and further determines which service needs to be executed currently. Correspondingly, after the identifying module 650 determines a service that needs to be executed, the list generating module 620 further selects, according to an execution policy corresponding to the service that is determined and needs to be executed, M data processing modules 640 for processing the packet, and determines a processing sequence for the selected M data processing modules 640 to process the packet.

It should be noted that, in this embodiment of the present disclosure, the transceiver module 610 may be a device or unit that can implement data transmitting and receiving functions, such as a network port, a universal serial bus (USB) interface, a radio frequency unit, an antenna, or a Wi-Fi communication module, and the list generating module 620 and the scheduling module 630 may be a central processing unit (CPU) or an application-specific integrated circuit (ASIC), which is not particularly limited herein.

It should be further understood that, for a specific operating principle and operating procedure of the network device provided in this embodiment of the present disclosure, reference may be made to the foregoing method embodiments, and details are not repeatedly described herein.

The following describes an operating process of the network device 60 provided in this embodiment of the present disclosure using an example.

(1) A transceiver module 610 receives a packet, the packet arrives at a scheduling entrance of a scheduling module 630, and the scheduling module 630 requests a module list from a list generating module 620.

(2) The list generating module 620 first generates a basic module list according to a configured policy set.

(3) A module in the basic module list, first obtains basic information of the packet, and determines which configuration condition the basic information meets.

(4) The packet returns to the scheduling module 630, it is found that a new condition is met, and a service that may need to be executed is found in all configured policies according to the new condition.

(5) The scheduling module 630 sends all newly obtained packet information to the list generating module 620, and requests an updated module list.

(6) The list generating module 620 generates a new module list according to the newly obtained information, a newly matched configuration condition, a current processing stage, and the service that may need to be executed.

(7) The scheduling module 630 obtains the new module list, and invokes a data processing module 640 in the new module list to process the packet.

(8) Scheduling is completed if the last data processing module 640 in the new module list has been executed and no new module is generated. Generally, the last data processing module 640 either sends the packet or discards the packet.

According to the network device 60 provided in this embodiment of the present disclosure, an impact of characteristic information of different packets on a processing process can be taken into consideration, and an impact of a currently configured policy on the processing process is also taken into consideration, thereby reducing unnecessary processing processes and redundant information collection in a policy execution procedure, avoiding an excessive processing procedure, improving overall performance, and enhancing service processing flexibility.

Figure 8:
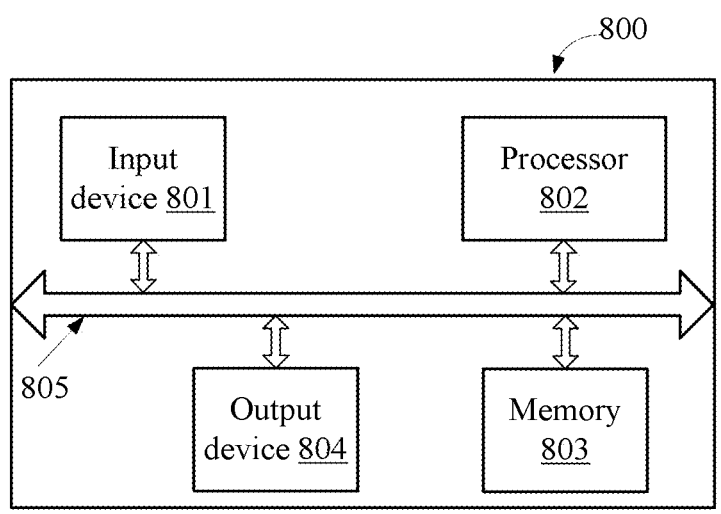
FIG. 8 is a schematic structural diagram of a network device according to another embodiment of the present disclosure.

FIG. 8 is a schematic structural diagram of another network device 800 according to an embodiment of the present disclosure. The network device 800 may include an input device 801, an output device 804, a processor 802, and a memory 803.

The memory 803 may include a read-only memory (ROM) and a random-access memory (RAM) and provides an instruction and data for the processor 802. A part of the memory 803 may further include a nonvolatile RAM (NVRAM).

The memory 803 stores the following elements. An executable module or a data structure, a subset of the executable module or the data structure, or an extension set of the executable module or the data structure.

An operating instruction includes various operating instructions, which are used to implement various operations.

An operating system includes various system programs, which are used to implement various basic services and process hardware-based tasks.

In this embodiment of the present disclosure, the processor 802 executes the following operations by invoking an operating instruction stored on the memory 803 (where the operating instruction may be stored in the operating system). Selecting, according to an execution policy of at least one service deployed on the network device 800, M data processing modules for processing a packet received by the input device 801, and determining a processing sequence for the selected M data processing modules to process the packet, invoking the selected M data processing modules to sequentially process, according to the processing sequence, the packet such that each invoked data processing module collects information of one dimension of the packet, and performing, according to all information of the packet that is collected, matching for all service rules included in the execution policy of the at least one service in order to determine a successfully matched service rule, and executing an action corresponding to the successfully matched service rule, where the network device 800 includes N data processing modules, N is greater than or equal to M, M and N are both positive integers, the execution policy of the service is used to control operation of the service, an execution policy of each service includes at least one service rule, each service rule includes a condition and an action, and matching of each service rule at least depends on information of one dimension of the packet.

In this embodiment of the present disclosure, after receiving the packet, the network device 800 determines, according to the execution policy of the service, a data processing module that needs to process the packet, and determines an execution sequence for each data processing module to perform processing such that the packet does not need to undergo processing of each data processing module, an unnecessary processing process and redundant information collection can further be reduced in a service execution procedure, and a function scope of the data processing module is controlled according to a need, thereby improving service processing flexibility and enhancing overall performance of the device.

The processor 802 controls an operation of the network device 800, and the processor 802 may further be called a CPU. The memory 803 may include a ROM and a RAM and provides an instruction and data for the processor 802. A part of the memory 803 may further include a NVRAM. In a specific application, each component of the network device 800 is coupled together using a bus system 805, where the bus system 805 includes a data bus and may further include a power bus, a control bus, a state signal bus, and the like. However, for clarity of description, various buses are marked as the bus system 805 in the diagram.

The methods disclosed in the foregoing embodiments of the present disclosure may be applied to the processor 802 or implemented by the processor 802. The processor 802 may be an integrated circuit chip and has a signal processing capability. In an implementation procedure, each of the steps of the foregoing methods may be completed using an integrated logical circuit of hardware in the processor 802 or an instruction in a form of software. The processor 802 may be a universal processor, a digital signal processor (DSP), an ASIC, a field programmable gate array (FPGA) or another programmable logical device, a discrete gate or a transistor logical device, or a discrete hardware component, and can implement or execute each of the methods, the steps, and the logical block diagrams disclosed in the embodiments of the present disclosure. The universal processor may be a microprocessor, or the processor may also be any conventional processor or the like. The steps of the methods disclosed in the embodiments of the present disclosure may be directly executed by a hardware decoding processor, or executed by a combination of hardware and a software module in a decoding processor. The software module may be located in a mature storage medium in the art, such as a random access memory, a flash memory, a ROM, a programmable ROM, an electrically erasable programmable memory, or a register. The storage medium is located in the memory 803. The processor 802 reads information in the memory 803 and completes the steps of the foregoing methods in combination with the hardware of the processor 802.

Optionally, the processor 802 may further generate a first list used to represent the processing sequence for the M data processing modules to process the packet.

Optionally, the processor 802 may further reselect, according to information of the packet that is collected by the first P data processing modules in the first list, one or more data processing modules for processing the packet, generate a second list that is used to indicate a sequence for the reselected data processing module to process the packet, and sequentially invoke, according to the sequence indicated by the second list, a data processing module in the second list to process a packet that has been processed by the first P data processing modules in order to obtain information of at least one dimension of the packet.

According to the network device provided in this embodiment of the present disclosure, after receiving a packet, the network device dynamically generates, according to an execution policy corresponding to a service, an execution sequence for data processing modules to process the packet, and further sequentially invokes, according to the sequence, each data processing module to process the packet such that the packet does not need to undergo processing of each data processing module and an unnecessary processing process and redundant information collection can be reduced in a service execution procedure, thereby improving service processing flexibility and enhancing overall performance of the device.

Persons of ordinary skill in the art may understand that all or a part of the steps of the method embodiments may be implemented by a program instructing relevant hardware. The program may be stored in a computer readable storage medium. The steps of the method embodiments are performed when the program runs. The foregoing storage medium includes any medium that can store program code, such as a ROM, a RAM, a magnetic disk, or an optical disc.

Finally, it should be noted that the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for scheduling a plurality of data processors and implemented by a scheduling device, the method comprising:
receiving a packet;
determining a first ordered set of the data processors for processing the packet, wherein the first ordered set comprises a first subset of the data processors;
processing the packet using one or more first data processors of the first subset of the data processors to obtain a first processing result;
determining a second ordered set of the data processors for processing the packet based on the first processing result, wherein the second ordered set comprises a second subset of the data processors; and
processing the packet using one or more second data processors of the second subset of the data processors to obtain a second processing result.

2. The method of claim 1, further comprising:
forwarding the packet to at least a portion of the second subset of the data processors in accordance with a second order; or
discarding the packet.

3. The method of claim 1, wherein the first ordered set is represented by a first identifier, and wherein the second ordered set is represented by a second identifier.

4. The method of claim 1, further comprising further determining the first ordered set based on characteristic information of the packet and a policy set.

5. The method of claim 4, wherein the policy set comprises an execution rule of one service.

6. The method of claim 4, wherein the characteristic information comprises at least one of a timestamp of the packet, a uniform resource locator (URL) carried in the packet, an Internet Protocol (IP) address, or port information.

7. A scheduling device, comprising:
a receiver configured to receive a packet;
a memory configured to store computer-executable instructions; and
a processor coupled to the receiver and the memory and configured to execute the computer-executable instructions to cause the scheduling device to be configured to:
determine a first ordered set of data processors for processing the packet, wherein the first ordered set comprises a first subset of the data processors;
process the packet using one or more first data processors of the first subset of the data processors to obtain a first processing result;
determine a second ordered set of the data processors for processing the packet, wherein the second ordered set comprises a second subset of the data processors; and
process the packet using one or more second data processors of the second subset of the data processors obtain a second processing result.

8. The scheduling device of claim 7, wherein the computer-executable instructions further cause the scheduling device to be configured to:
forward the packet to at least a portion of the second ordered set in accordance with a second order indicated by a second identifier; or
discard the packet.

9. The scheduling device of claim 7, wherein the first ordered set is represented by a first identifier, and wherein the second ordered set is represented by a second identifier.

10. The scheduling device of claim 7, wherein the computer-executable instructions further cause the scheduling device to be configured to further determine the first ordered set based on characteristic information of the packet and a policy set.

11. The scheduling device of claim 10, wherein the policy set comprises an execution rule of one service.

12. The scheduling device of claim 10, wherein the characteristic information comprises at least one of a timestamp of the packet, a uniform resource locator (URL) carried in the packet, an Internet Protocol (IP) address, or port information.

13. The scheduling device of claim 10, wherein the data processors comprise virtual elements embedded in a network device.

14. The scheduling device of claim 10, wherein the scheduling device is embedded in a network device.

15. A service processing system, comprising:
a plurality of data processing devices configured to perform packet processing;
an identifying device configured to:
identify characteristic information of a packet; and
determine, based on the characteristic information and a policy set, a first ordered set of the data processing devices for processing the packet, wherein the first ordered set comprises a first subset of the data processing devices, and wherein the first ordered set is represented by a first identifier; and
a scheduling device configured to:
receive the packet with the first identifier from the identifying device; and
forward, based on the first identifier, the packet to the first subset of the data processing devices in accordance with a first order indicated by the first identifier.

16. The service processing system of claim 15, wherein the first ordered set comprises a first data processing device configured to:
obtain a processing result after processing the packet; and
determine, according to the processing result, a second ordered set of the data processing devices, and
wherein the second ordered set is represented by a second identifier.

17. The service processing system of claim 15, wherein the scheduling device is further configured to:
receive the packet with a second identifier from a first data processing device, wherein the second identifier indicates a second order; and
forward, based on the second identifier, the packet to a second subset of the data processing devices that are in a second ordered set in accordance with the second order.

18. The service processing system of claim 15, wherein the data processing devices are virtual elements or are embedded in a physical network element.

19. The service processing system of claim 15, wherein the identifying device is embedded in the scheduling device.

20. The service processing system of claim 15, wherein the identifying device, the scheduling device, and the data processing devices are virtual elements or are embedded in a physical network element.

* * * * *